(12) United States Patent
Chi et al.

(10) Patent No.: US 6,398,940 B1
(45) Date of Patent: Jun. 4, 2002

(54) METHOD FOR FABRICATING NANOSCALE PATTERNS ON A SURFACE

(75) Inventors: Quijin Chi; Jingdong Zhang, both of Virum; Jens Enevold Thaulov Andersen, Vedbaek; Jens Ulstrup, Frederiksberg; Esben Peter Friis, Valby, all of (DK)

(73) Assignee: Danmarks Tekniske Universitet, Kgs. Lyngby (DK)

( * ) Notice: Subject to any disclaimer, the term of this patent is extended or adjusted under 35 U.S.C. 154(b) by 0 days.

(21) Appl. No.: 09/497,881

(22) Filed: Feb. 4, 2000

(30) Foreign Application Priority Data

Feb. 5, 1999 (DK) .......................... 1999 00156

(51) Int. Cl.$^7$ .............................. C25F 3/02; C25F 3/12

(52) U.S. Cl. .................. 205/640; 205/656; 205/665; 205/674

(58) Field of Search .................. 205/656, 665, 205/640, 674

(56) References Cited

U.S. PATENT DOCUMENTS

| | | | |
|---|---|---|---|
| 4,896,044 A | 1/1990 | Li et al. | |
| 5,015,323 A | 5/1991 | Gallagher | |
| 5,359,199 A | 10/1994 | Fuchs et al. | |
| 5,481,521 A | 1/1996 | Washizawa et al. | |
| 5,865,978 A | * 2/1999 | Cohen | 205/664 X |

FOREIGN PATENT DOCUMENTS

| | | |
|---|---|---|
| EP | 325056 | 7/1989 |
| EP | 450771 | 9/1991 |
| EP | 665541 | 2/1995 |

OTHER PUBLICATIONS

R. S. Becker et al., "Atomic–scale surface modifications using a tunnelling microscope," Nature (London) vol. 325, Jan. 1987, pp. 419–421.

D. M. Eigler et al., "Positioning single atoms with a scanning tunnelling microscope," Nature, vol. 344, Apr. 1990, pp. 524–526.

Joseph A. Stroscio et al., "Atomic and Molecular Manipulation with the Scanning Tunneling Microscope," Nov. 1991, Science, vol. 254, pp. 1319–1326.

M. F. Crommie et al., "Confinement of Electrons to Quantum Corrals on a Metal Surface," Science, vol. 262, Oct. 1993, pp. 218–220.

(List continued on next page.)

Primary Examiner—Donald R. Valentine
(74) Attorney, Agent, or Firm—Birch, Stewart, Kolasch & Birch, LLP

(57) ABSTRACT

A novel method to fabricate nanoscale pits on Au(111) surfaces in contact with aqueous solution is claimed. The method uses in situ electrochemical scanning tunnelling microscopy with independent electrochemical substrate and tip potential control and very small bias voltages. This is significantly different from other documented methods, which mostly apply high and short voltage pulses. The most important advantages of the present method are that the dimensions and positions of the pits can be controlled with high precision in aqueous environment so that nanopatterns of the pits can be designed, and that the operations are simple and require no instrumental accessories. Parameters, which control the pit formation and size, have been systematically characterized and show that the primary controlling parameter is the bias voltage. A mechanism based on local surface reconstruction induced by electronic contact between tip and substrate is in keeping with the overall patterns for pit formation. A range of potential applications is proposed.

21 Claims, 13 Drawing Sheets

(4 of 13 Drawing Sheet(s) Filed in Color)-

(a) Formation of pits    $d_1 << d_2$    (b) Imaging of pits
$V_{b(1)} << V_{b(2)}$

OTHER PUBLICATIONS

In-Whan Lyo et al., "Field-Induced Nanometer-to Atomic-Scale Manipulation of Silicon Surfaces with the STM," Science, vol. 253, Jul. 1991, pp. 173–176.

A. Kobayashi et al., "Formation of Nanometer-Scale Grooves in Silicon with a Scanning Tunneling Microscope," Science, vol. 259, Mar. 1993, pp. 1724–1726.

T. R. Albrecht et al., "Nanometer-scale hole formation on graphite using a scanning tunneling microscope," Appl. Phys. Lett. 55 (17), Oct. 1989, pp. 1727–1729.

C. Lebreton et al., "Nanofabrication on gold surface with scanning tunneling microscopy," Microelectronic Engineering 30, 1996, pp. 391–394, No month.

Hiroyuki Sugimura et al., "Scanning Tunneling Microscope Tip-Induced Anodization for Nanofabrication of Titanium," 1994 American Chemical Society, pp. 4352–4358, No month.

Jin-Lin Huang et al., "Field-Induced surface modification on the atomic scale by scanning tunneling microscopy," Appl. Phys. Lett. 61(13), Sep. 1992, pp. 1528–1530.

S. Hosaka et al., "Fabrication of nanostructures using scanning probe microscopes," J. Vac. Sci. Technol. B 13(6), Nov./Dec. 1995, pp. 2813–2818.

R. E. Thomson et al., "Surface modification of $Yba_2Cu_3O_{7-8}$," National Institute of Standards and Technology, 1994, pp. 57–59, No month.

Reginald M. Penner et al., "Nanometer-scale electrochemical deposition of silver on graphite using a scanning tunneling microscope," Appl. Phys. Lett. 60 (10), Mar. 1992, pp. 1181–1183.

J. H. Ye et al., "Local modification of n-Si(100) surface in aqueous solutions under anodic and cathodic potential polarization with an in situ scanning tunneling microscope," J. Vac. Sci. Technol. B 13(4), Jul./Aug. 1995, pp. 1423–1428.

D. M. Kolb et al., "Nanoscale decoration of Au(111) electrodes with Cu clusters by an STM," Chemical Physics Letters, Vol. 209, No. 3, Jul. 1993, pp. 238–242.

D. M. Kolb et al., "Nanostructuring of Electrode Surfaces by Tip-Induced Metal Deposition," Ber. Bunsenges. Phys. Chem. 99, 1995, No. 11, pp. 1414–1420, No month.

D. M. Kolb et al., "Nanofabrication of Small Copper Clusters on Gold(111) Electrodes by a Scanning Tunneling Microscope," Science, Vol. 275, Feb. 1997, pp. 1097–1099.

D. M. Kolb et al., "Nanofabrication of Small Palladium Clusters on Au(111) Electrodes with a Scanning Tunnelling Microscope," J. Electrochem. Soc., vol. 145, No. 3, Mar. 1998, pp. L33–L35.

* cited by examiner

METHOD FOR FABRICATING NANOSCALE PATTERNS ON A SURFACE

FIELD OF INVENTION

The present invention relates to a novel process for fabricating nanopits and nanoscale patterns on surfaces of solids at room temperature in a liquid environment by applying extremely small bias voltages in an electrochemical scanning tunnelling microscopy mode. Size-controlled, location selective, and time stable nanopits may be created routinely by this method in a liquid solution without additional experimental set-up. The feasibility of formation and the stability of nanoscale pits and patterns make them of interest for potential applications in the context of information storage, as immobilisation sites for active biological molecules, and in other ways.

BACKGROUND OF THE INVENTION

Nanometer and atomic-scale modifications of materials have long been desired from both scientific and technical points of view. However, direct visualisation on the nanometer scale could not come true until the first half of this century with the invention of the electron microscope. The advent of the local probe microscopes, particularly the scanning tunneling microscope (STM) has advanced imaging and measuring to the atomic level since the 1980s. Furthermore, STM can serve as a useful tool, not only imaging with unprecedented resolution but controlling and fabricating nanostructures in the nanoworld.

One of the most striking examples is to create new functional structures with nanometer or atomic scale on solid surfaces by the STM through its three main operations: manipulation, removal, and deposition.

Becker and co-workers (Becker et al., Nature (London) 325 (1987) 419) first reported an atomic-scale modification of Ge(111) with the STM. Following this initial achievement, Eiger et al. showed many more exciting results by using STM. For instance, they deposited individual Xe atoms on the Ni(110) surface to create various patterns and constructed quantum corrals from single atoms (Eiger et al., Nature (London) 344 (1990) 524; Science 254 (1991) 1319; Science 262 (1993) 218). These results show that single atoms can be manipulated and desired structures at an atomic level built. These pioneering studies were done in ultra high vacuum (UHV) at low temperature (4 K) where atoms were 'frozen-in' so as to keep them from moving around owing to their thermal energy.

The nanoscale modification of solid surfaces at ambient temperature condition either in UHV or in air was subsequently explored. Successful examples include nanofabrication of mounds and/or pits on different materials such as Si, HOPG, metals, semiconductors, and superconductors (Lyo et al., Science 253 (1991) 173. Kobayashi et al., Science 259 (1993) 1724. Albrecht et al., Appl. Phys. Lett. 55 (1989) 1727. Lebreton et al., Microelectron. Eng. 30 (1996) 391. Sugimura et al., J. Phys. Chem. 98 (1994) 4352. Huang et al., Appl. Phys. Lett. 61 (1992) 1528. Hosaka et al., J. Vac. Sci. Technol. B13 (1995) 2813. Thompson et al., Nanotechnology 5 (1994) 57). In addition, it has been demonstrated that individual molecules can be manipulated with STM tips at room temperature without disruption of the molecular structure.

Common to these investigations is that the appropriate nanostructures are implemented by large (i.e. several volts) bias voltages, either in continuous or in pulse modes. Extension of the working environment to metal/liquid solution interfaces would strongly broaden the perspectives for nanofabrication of surface structures. A wealth of solute molecules and ions could thus be starting materials in controlled adsorption and electrochemical electron transfer modes. In comparison with nanoscale modification in UHV reports of controlled nanofabrication in aqueous electrochemical environments are, however, few in numbers.

Extension of STM to aqueous and other conducting liquids requires operation in the electrochemical, or in situ mode. Control of the separate potentials of the substrate and STM tip, relative to a common reference electrode is here essential. Otherwise the tunnel current is entirely hidden by much larger Faradaic currents associated with uncontrolled solvent decomposition, metal dissolution and deposition processes etc. In addition insulating material except for the outermost end must cover the tip. This is because the Faradaic currents follow the exposed electrode area while the tunnelling current is independent of the area and carried only by a small tip region closest to the substrate surface. Penner et al. (Penner et al., Appl. Phys. Lett. 60 (1992) 1181) first attempted to use electrochemical STM for the deposition of nanoscale metal clusters on HOPG.

The fabrication of nanopits on Si (100) under electrochemical environment was also attempted by Ye et al. (J. Vac. Sci. Technol. B13 (1995) 1423), but the control in dimensions and locations of pits was not satisfactory and demonstrated to be more difficult than in air or in UHV. Kolb, and associates (Kolb et al., Chem. Phys. Lett. 209 (1993) 239; Ber. Bunsenges. Phys. Chem. 99 (1995) 1414; Science 275 (1997) 1097. Engelmann, J. Electrochem. 145 (1998) L33) have more recently developed a procedure for depositing locally nanoscale clusters of Cu and Pd on Au(111) surfaces using in situ STM and well defined electrochemical conditions. The Au(111) and tip potentials were initially chosen in such a way that the Au(111) surface was covered by a layer of underpotential deposited copper, and excess copper was also present on the tip. A 50–90 mV potential step temporarily inverts the potential bias. This takes the tip close enough to the surface that a cluster of copper or palladium atoms is transferred from the tip to the surface.

In U.S. Pat No. 4,896,044 a method resting on a two-electrode configuration (substrate and tip) operated in air was presented. Claimed extension to operation in liquids does not apply to conducting liquids such as water where, as noted double potentiostatic control and tip coating is essential. Topographic depressions in the Au(111) surface are implemented when the bias potential in the constant current mode is stepped from 0.65 V to a value of at least 2.7 V in 500 $\mu$s pulses. This raises the tunnel current from 1 nA to values between 10 and 100 nA which is sufficient to evaporate material from the substrate. There is no evidence of material about the orifice of the craters but hillocks with no craters are formed on longer time exposure to large tunnel currents or bias voltages.

It should be noted that the claimed extension of the method in U.S. Pat. No. 4,896,044 to liquids is not documented and that the nature of the liquid is not specified. Furthermore, the claimed mechanism involving metal evaporation in U.S. Pat. No. 4,896,044 is reputed to be still controversial.

It is a disadvantage of the method in U.S. Pat. No. 4,896,044 that it only works in a nonconducting environment.

It is a further disadvantage of the method in U.S. Pat. No. 4,896,044 that a relative high bias voltage (at least 2,7 V) has to be applied in order to evaporate material from the substrate making the method in U.S. Pat. No. 4,896,044 less controllable and therefore less attractive seen from an industrial point of view.

It is an object of the present invention to provide a method for fabricating nanopits and nanoscale patterns in a conducting liquid environment.

It is a further object of the present invention to provide a method wherein the fabricating of nanopits and nanoscale patterns can be well controlled regarding pits-size and nanoscale pattern reproducibility.

SUMMARY OF THE INVENTION

The above-mentioned objects are complied with by providing a method for forming at least one nanoscale depression in a surface of a substrate, said method comprising the steps of:

immersing at least part of the surface of the substrate into a liquid environment, immersing at least part of an object into the liquid environment, bringing the object within proximity of the surface of the substrate by applying a first set of operation parameters, said first set of operation parameters comprising bias voltage, tunnel current and working potential, and forming at least one nanoscale depression in the surface of the substrate by applying a second set of operation parameters, said second set of operation parameters comprising bias voltage, tunnel current and working potential, wherein the bias voltage of the second set of operation parameters is negative.

The bias voltage is applied between the object and the surface of the substrate. As mentioned above, the bias voltage of the second set of operation parameters is negative. By negative is meant that, the potential of the object is lower than the potential of the surface of the substrate. The object may form part of a tip of a scanning probe microscope, such as a scanning tunneling microscope.

The bias voltage of the second set of operation parameters may be in the range −10 mV–0 V, preferably in the range −8 mV–0 V, more preferably in the range −4 mV–0 V, such as approximately −2 mV. The tunnel current of the second set of operation parameters may be in the range 0–10 nA, preferably in the range 0–6 nA, more preferably in the range 0–4 nA, even more preferably in the range 2–3 nA.

The working potential of the second set of operation parameters may be in the range −0.1–0.5V vs NHE, preferably in the range 0–0.4 V vs NHE, more preferably in the range 0.1–0.3 V vs NHE.

The bias voltage of the first set of operation parameters may be in the range 100–300 mV, and wherein the tunnel current of the first set of operation parameters is in the range 0.5–5 nA, and wherein the working potential of the first set of operation parameters is in the range 0.1–0.6 V vs NHE.

The liquid environment may be an electrically conducting environment, which may comprise an aqueous acidic, basic, neutral, or salt containing electrolyte solution such as $HClO_4$. The concentration of the $HClO_4$ solution may be in the range $10^{-3}$–10 M, preferably in the range 0.02–0.4 M, more preferably in the range 0.03–0.3 M and even more preferably in the range 0.05–0.1 M. Alternatively or in addition, the liquid environment may comprise chloride, sulphate, or other adsorbing inorganic or organic anions or molecules.

Part of the surface of the substrate may hold an electrically conducting material, such as a metal, so that the at least one depression is formed in said electrically conducting material. Part of the surface of the substrate may hold a gold film, or constitutes bulk gold. Part of the surface of the substrate may hold a semiconductor material, such as silicon.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
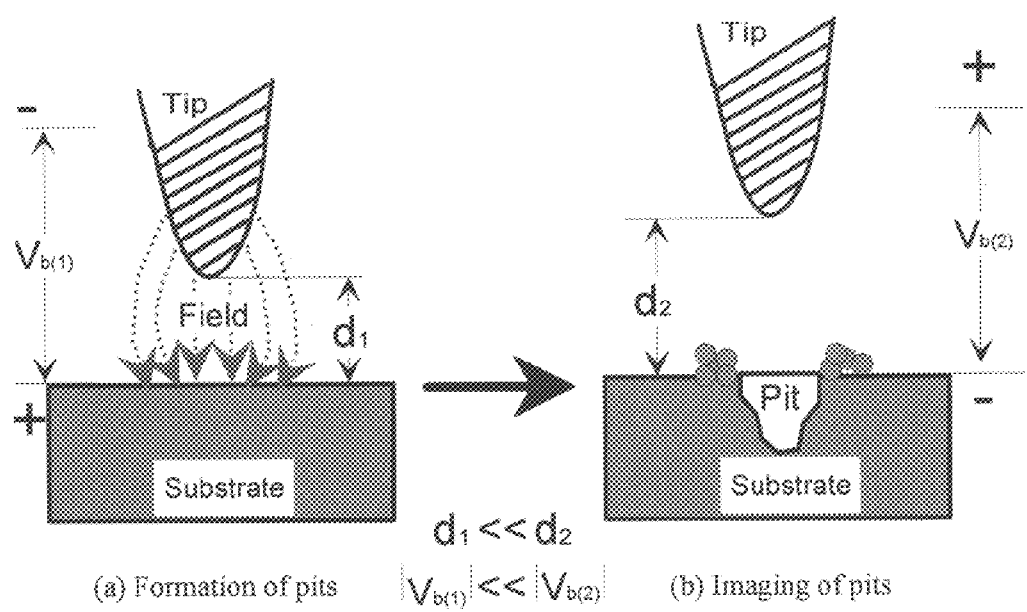
FIG. 1 shows a schematic depiction of the difference in the STM tip and substrate configuration during the formation (a) and imaging (b) of nanopits.

A $HClO_4$ solution (0.05–0.1 M) was prepared by diluting original ultrapure $HClO_4$ (70%) obtained from Fluka with ultrapure water (Millipore Milli-Q with a resistance of 18.2 MΩ) and used as electrolyte solution through all experiments. All solutions were thoroughly purged with Ar before electrochemical STM experiments and an Ar atmosphere was always maintained during the operations.

The gold single-crystal beads were prepared by melting the ends of Au wire (0.8 or 1.0 mm in diameter, purity>99.99%) in a hydrogen-oxygen flame (Hamelin, J. Electroanal. Chem. 407 (1996) 1). The Au(111) facets formed on the single-crystal bead were used for STM measurements. The single-crystal substrates were annealed in the $H_2$ flame and quenched in Millipore water saturated with $H_2$ prior to each experiment. This procedure resulted in atomically flat terraces with a large area, which meets the requirement of nanofabrication.

The W tips with a small curvature radius were prepared by electrochemically etching of W wire (0.38 mm in diameter) in KOH solution and coated with apiezon wax to reduce or eliminate Faradaic currents.

A commercial Rasterscope™ 3000-EC instrument (DME company, Denmark) equipped with a bipotentiostat for independent potential control of substrate and tip was used in both nanofabrication and imaging. Electrochemical control was conducted in a special designed cell compatible with the STM instrument by using a three-electrode system. All working potentials are reported with respect to NHE.

Both nanofabrication and imaging were performed in the constant-current mode. The operation of nanofabrication is in principle similar to that of normal in situ STM imaging. The main points of the present invention accord with the following steps.

a) A relatively large area (typically 1000×1000 nm$^2$) on the substrate surface was pre-selected by STM imaging. This area served as a locus for the fabrication of nanoscale patterns consisting of individual pits.

b) Individual nanopits could be formed on the preselected area (step (a)) by the STM tip scanning confined to a suitable scan area under an extremely small bias voltage (typically −2 mV) and a modest tunnel current (typically 2–3 nA).

c) The desired position of the nanopits was controlled by setting X and Y-axis coordination for the STM tip.

d) The dimensions of pits (10 to 500 nm in diameter) can be controlled by applying STM operation parameters, typically the tunnel current, the scan rate, the bias voltage, the scan area, and the working potential.

e) Once the desired individual nanopits were fabricated by repeating step (b), STM imaging with normal operation conditions (larger bias voltages) followed to observe and record nanopatterns.

f) Both fabrication and imaging of specific nanopatterns were carried out with the same STM tip under the control of the same working potential.

In short, the nanofabrication includes three essential steps:

1. Pre-selecting an area suitable for formation of nanoscale pits
2. Writing process—fabrication or formation of nanoscale pits
3. Recording process—imaging the fabricated nanoscale pits Regarding the writing process, typical operation parameters were the bias voltage of −2 mV, the tunnel current of 2–3 nA and working potential at 0.3 V vs NHE for the writing, respectively.

A bias voltage of 200 mV, a tunnel current of 1.0–1.2 nA, and working potential at 0.3 V vs NHE were typical parameters during the pre-selecting and recording processes.

FIG. 1 shows schematically the difference in the distance and state between STM tip and substrate during the formation (FIG. 1(a)) and imaging (FIG. 1(b)) of nanopits.

This difference can be realised by changing bias voltage and tunnel current. When the distance between tip and substrate is reduced to a threshold value by applying an extremely small bias voltage, the interaction of tip with substrate becomes strong enough to create nanopits on the substrate surface. It is also necessary to keep the STM tip with negative polarity vs substrate. These are fundamental principles for nanopit formation. In contrast, subsequent imaging is at larger distances and weaker interaction between the tip and the substrate by pre-setting larger bias voltage.

Figure 2:
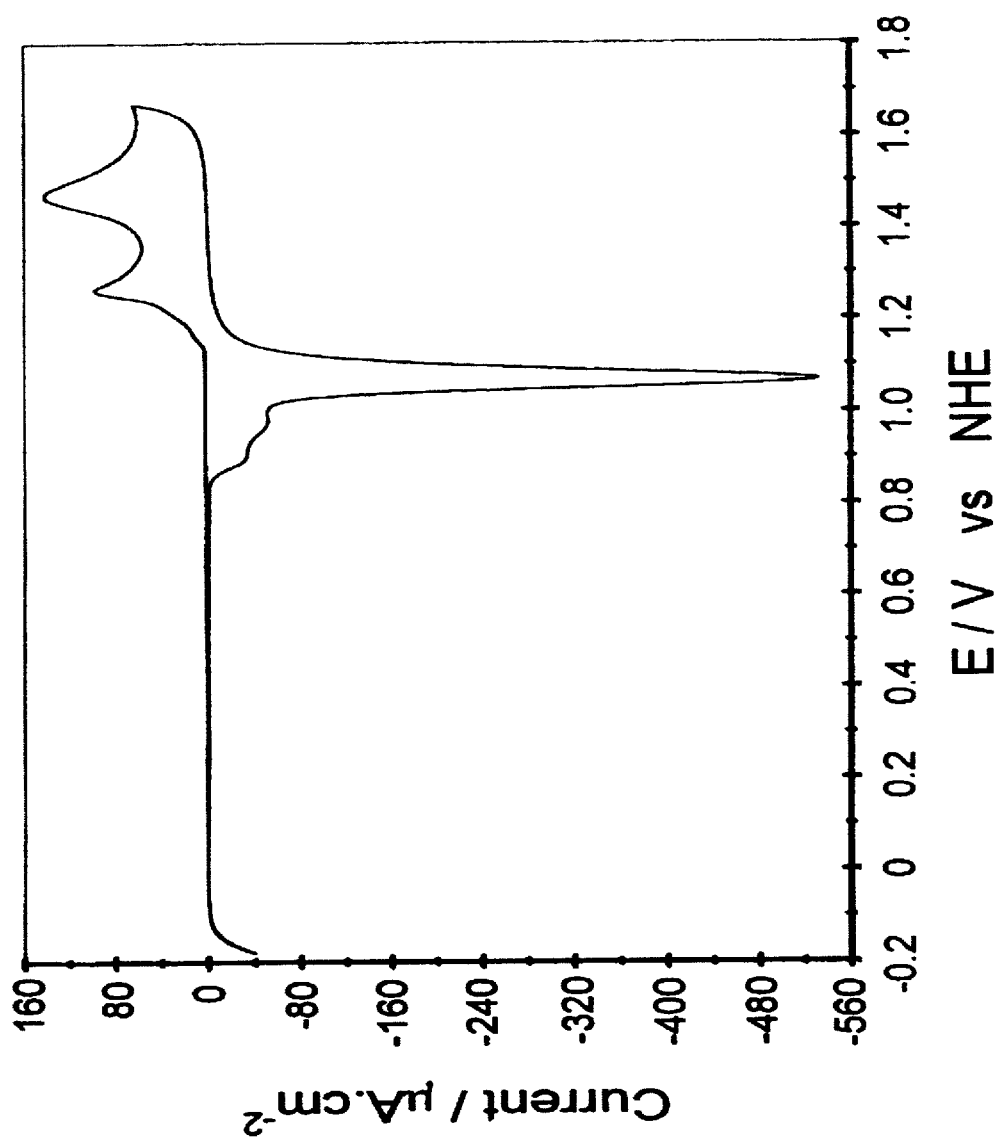
FIG. 2 shows a standard cyclic voltammogram (CV) of Au(111) in 0.1 M $HClO_4$ solution. From this figure we can see that Au(111) has a ca. 800 mV double layer region from −0.1 to 0.7 V vs NHE (normal hydrogen electrode), the potentiostatic control for nanofabrication was set in this region.

A standard cyclic voltammogram (CV) of Au(111) in HClO$_4$ is shown in FIG. 2. There is a broad double layer potential range (ca 800 mV) from −0.1 to 0.7 V vs NHE, limited by dihydrogen evolution at low potentials and formation of several gold oxide phases at high potentials. These voltammetric features in all respects accord with reported patterns for Au(111) in this solution. The potentiostatic control was set within this range for both writing and recording processes, in order to avoid that any unnecessary electrochemical reactions are involved.

Figure 3A:
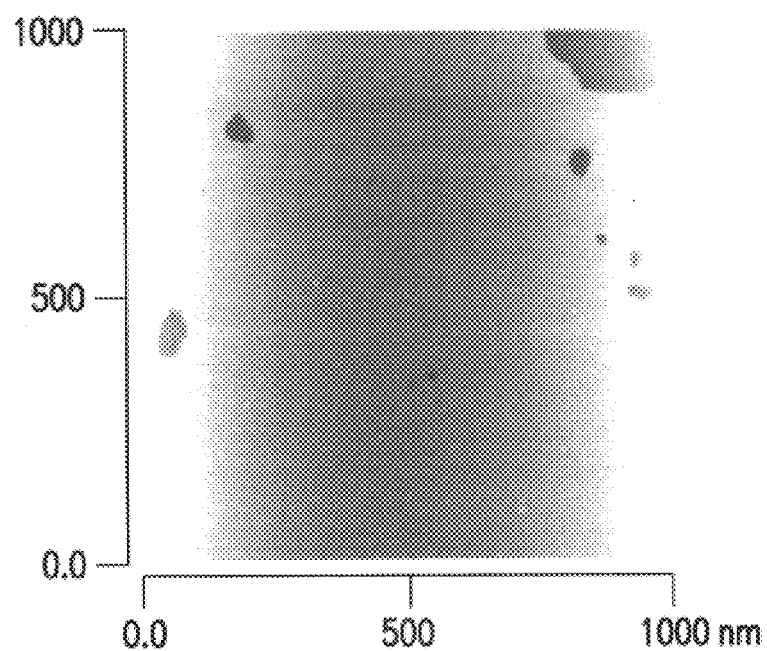
FIG. 3 shows in situ STM images (raw data) of a Au(111) surface consisting of atomically flat terraces in $HClO_4$ solution. Imaging parameters: bias voltage+200 mV, tunnel current 1.0 nA, scan areas: (a) 1000×1000 $nm^2$, and (b) 200×200 $nm^2$.
Figure 3B:
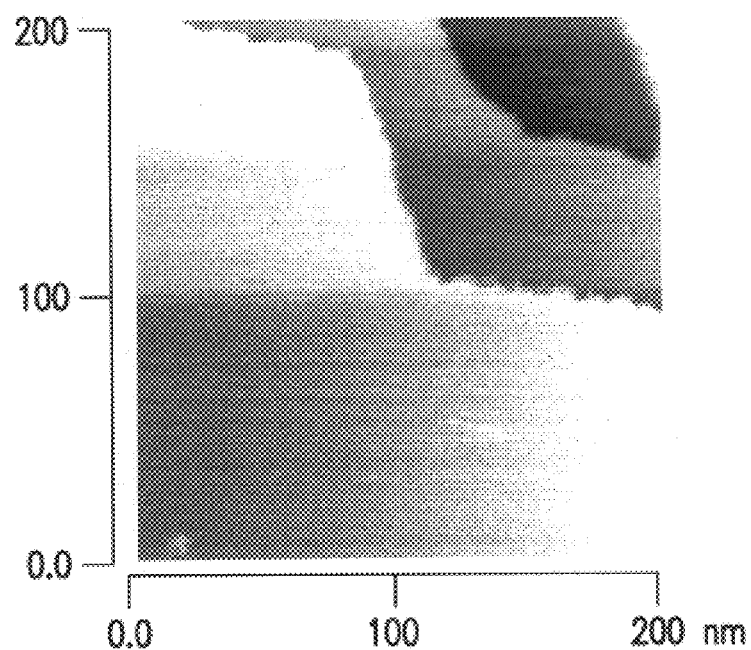

FIG. 3 presents typical in situ STM images of the Au(111) surface consisting of atomically flat terraces over several hundred nanometers. Single-atom layer terraces are visible in FIG. 3(b). Thus, the formation of nanopits is easily distinguished from the background of these virtually defect-free surfaces. Such images were always recorded before the fabrication of nanoscale patterns. They served as the preselected area for the location of specific nanopatterns.

Figure 4A:
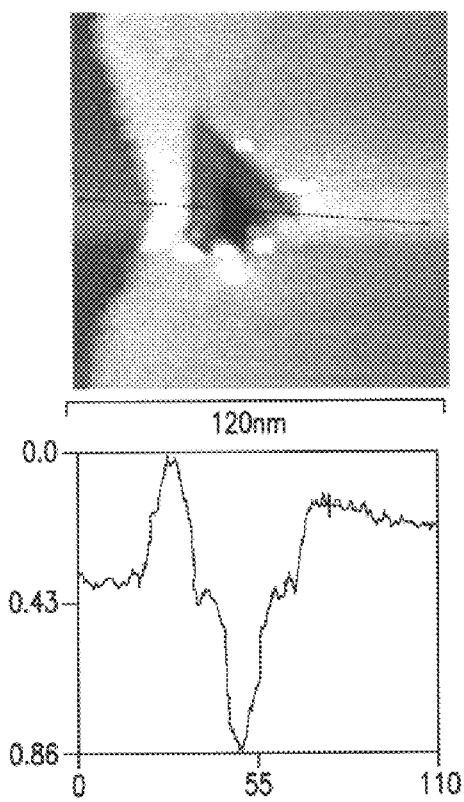
FIG. 4 shows two typical kinds of nanopits with a triangular shape (a) and elliptical shape (b). Their cross sections are shown in lower parts.
Figure 4B:
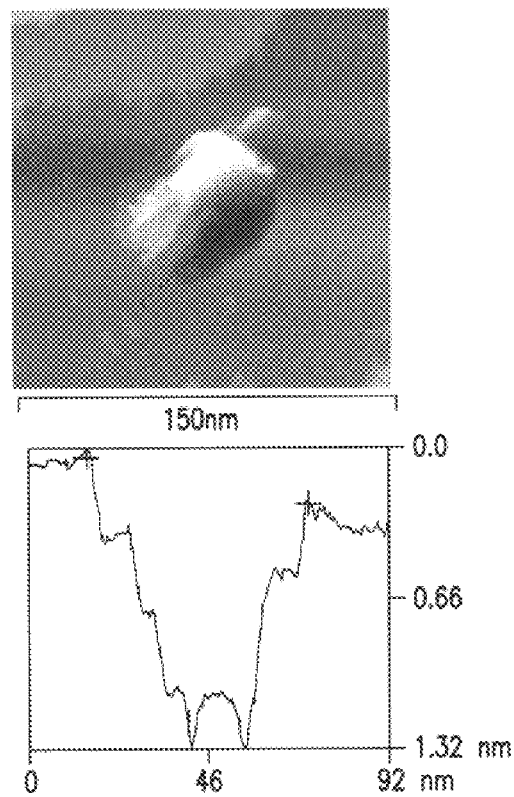

FIG. 4 shows in situ STM images of two individual pits. They represent two typical shapes of pits that were frequently formed in the present fabrication. The lateral extension is ca 40 nm, the depth about two atomic layers. Single-atom layer structures can be distinguished in both images, and the details of pit structures can be further featured in their cross sections. The pit shown in FIG. 4(a) is triangular in lateral shape and associates possibly with Au(111)'s own surface structure, while the pit in FIG. 4(b) is rather more elliptical in shape. Mounds of substrate atoms can be seen close to the surrounding edge of the pits, according with the potential region with full electrode polarisation and no electrochemical dissolution of gold. The pits are stable for days and no sign of disintegration were observable during the further fabrication and imaging. This forms the basis for fabrication of patterns consisting of nanopits, two examples of which are shown in FIG. 5.

Figure 5A:
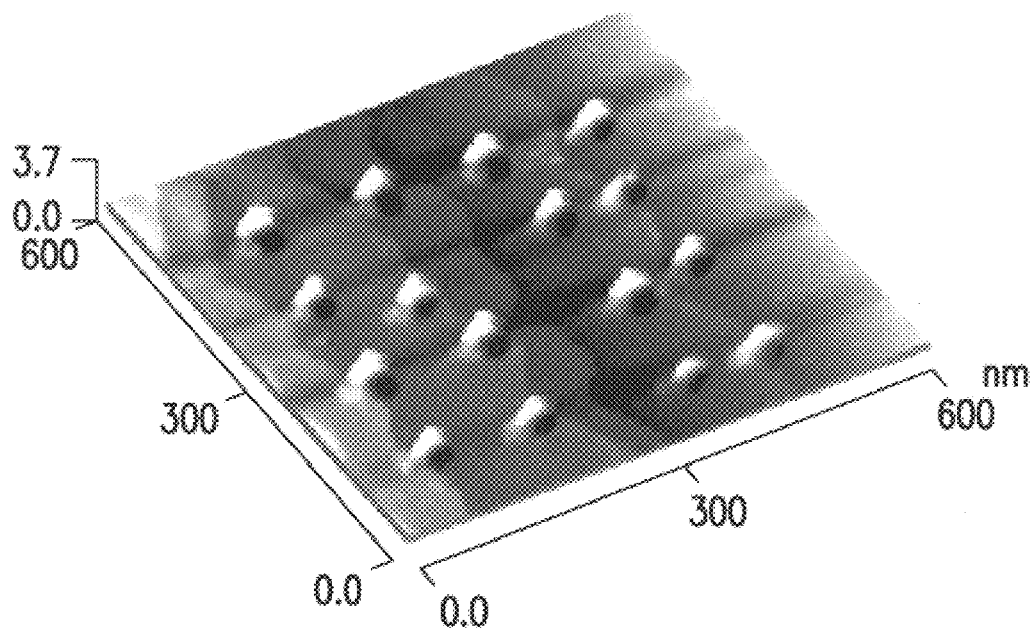
FIGS. 5a–b shows two examples of nanopatterns fabricated by the method according to the present invention: (a) A stable lattice consisting of 4×4 holes with a lattice periodicity of 100 nm; and (b) a pattern of "STM" letters consisting of individual nanopits with a diameter of approximately 40 nm.
Figure 5B:
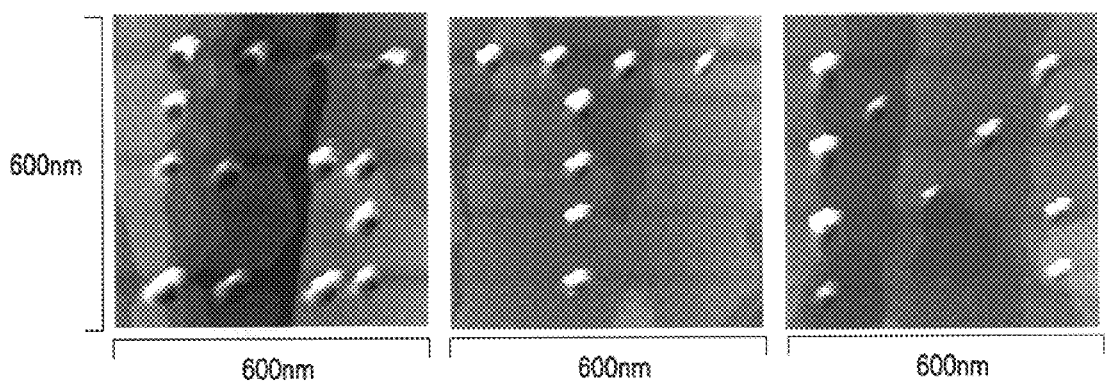

The pattern in FIG. 5(a) is a stable lattice consisting of 4×4 holes with a lattice periodicity of 100 nm, while the pattern in FIG. 5(b) is comprised of the three letters "S T M". Pits accompanied by mounds or hillocks at the edges are seen consistently. The feasibility of such pattern formation and their stability make them technologically interesting in the context of information storage, as immobilisation sites for active enzymes, and in other ways discussed briefly below.

Figure 6A:
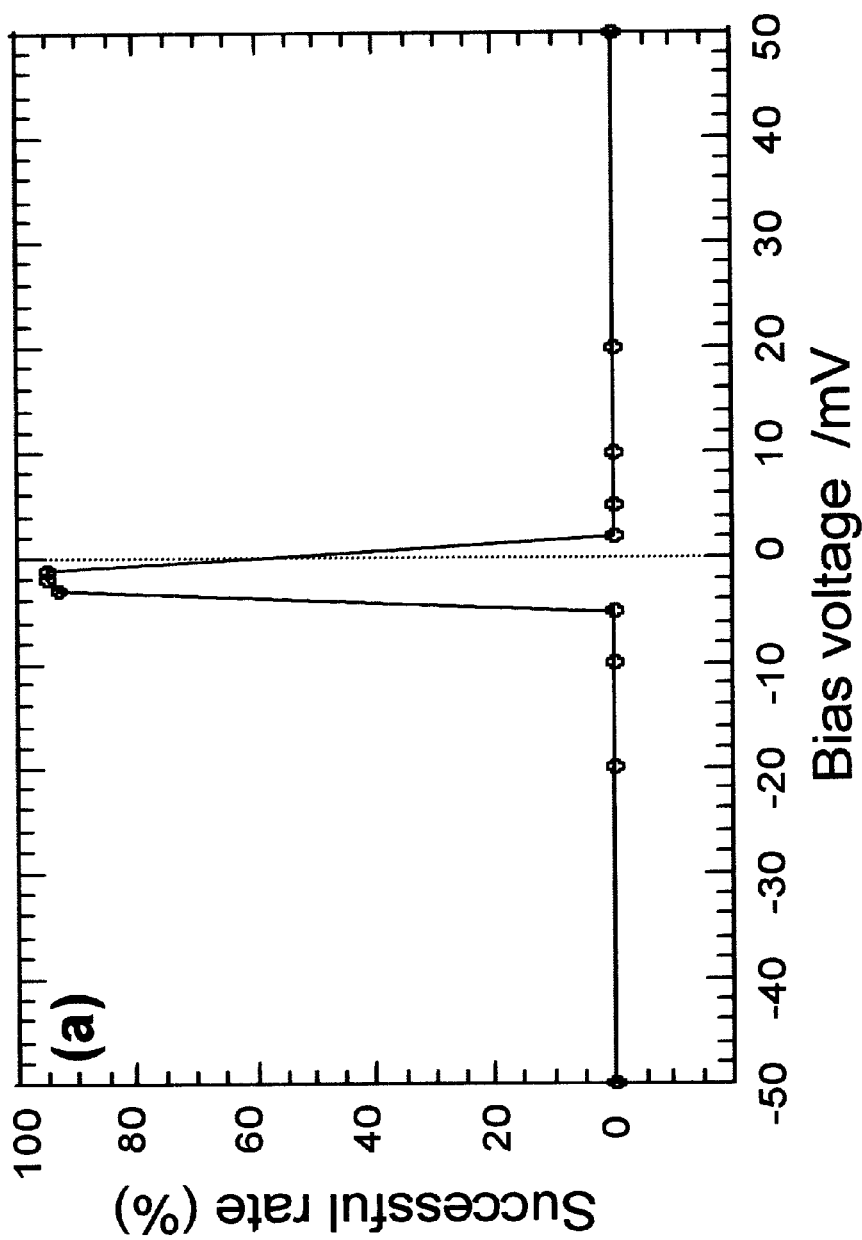
FIGS. 6a–c shows plots of successful rate for nanopit formation against various operation parameters: (a) bias voltage, (b) tunnel current, (c) working potential.
Figure 6B:
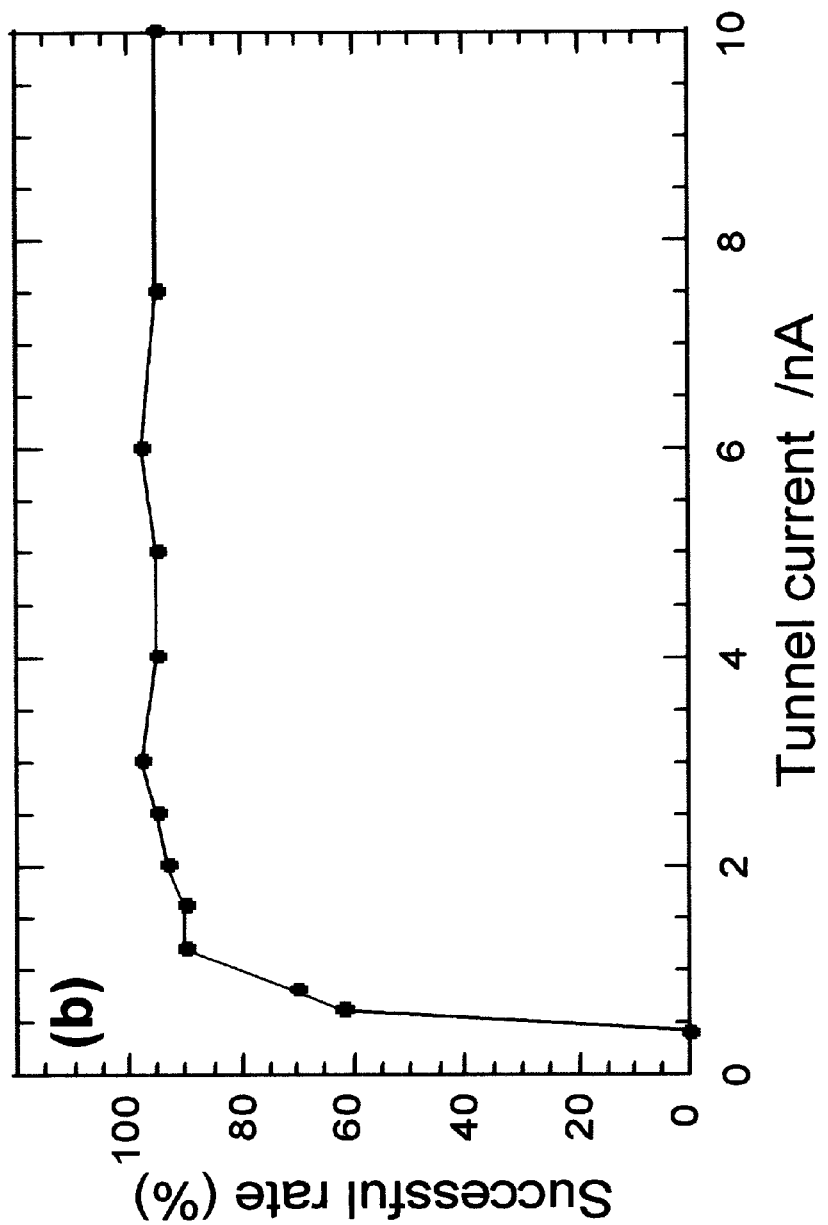
Figure 6C:
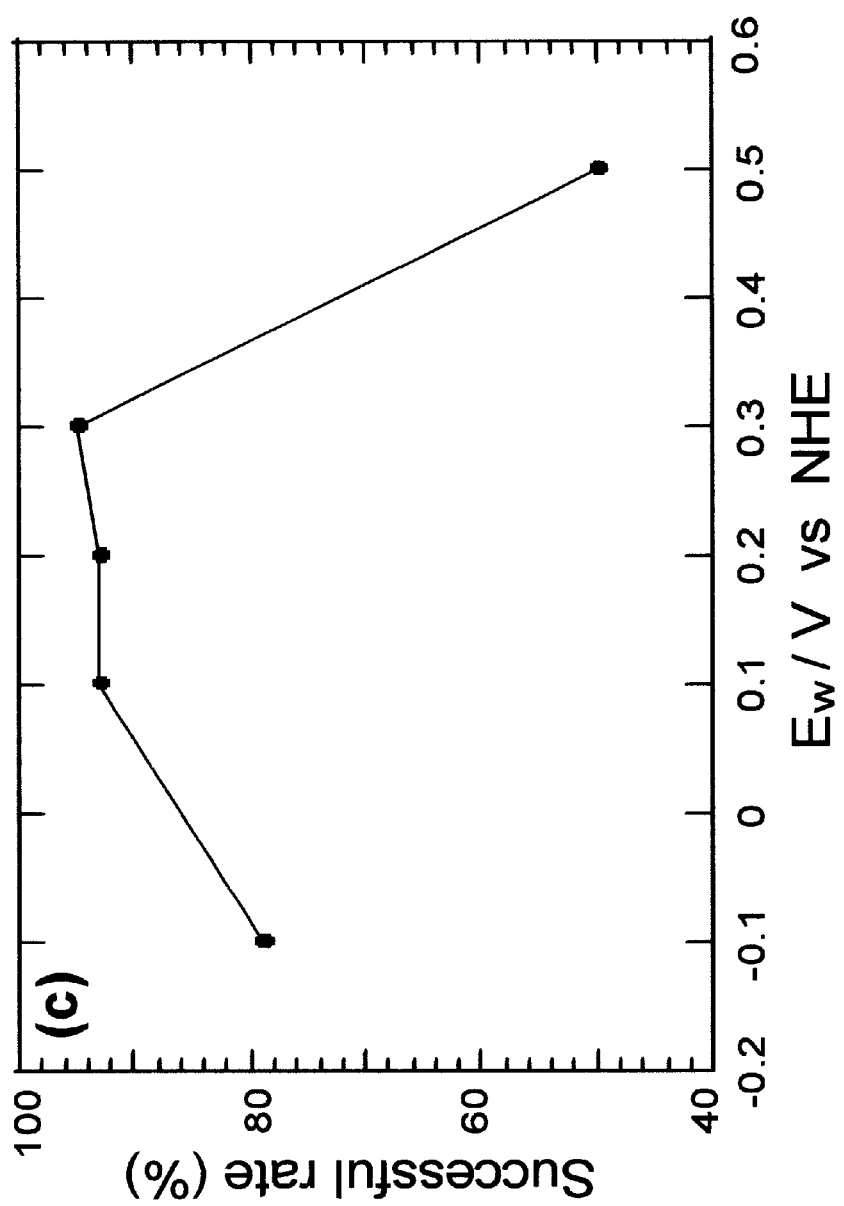

Operational conditions that affect the formation and dimensions of nanopits have been systematically investigated. FIG. 6 shows the dependence of the probability for pit formation on the tunnel current, bias voltage, and working potentials. Pit formation is feasible over most of the double layer potential region of the Au(111) substrate, with over 90% efficiency in the range 0.1–0.3 V (FIG. 6(c)). A threshold effect is associated with the phenomenon such as see in FIG. 6(b). The efficiency is, moreover close to 100% for tunnel currents $l_t$>1 nA up to 10 nA which is the highest possible value of the commercial Rasterscope™ 3000-EC instrument. Below $l_t$ ≈1 nA the efficiency drops rapidly and approaches zero as $l_t$→0.5 nA. FIG. 6(a) shows the most intriguing feature of the pit formation process. In the electrode potential and tunnel current regions of maximum efficiency, i.e. 0.1 V–0.3 V, and 1 nA–10 nA, respectively nanopits are only formed in an extremely narrow and low bias voltage range, i.e. literally a couple of mV. This "jumping" feature almost resembles critical behaviour. The sharp maximum is, moreover, very close to zero bias voltage but consistently at small negative substrate-tip bias voltages. The bias-voltage-dependent feature is quite distinct from all other reported cases of nanostructure fabrication in either the in situ or ex situ STM modes.

Figure 7A:
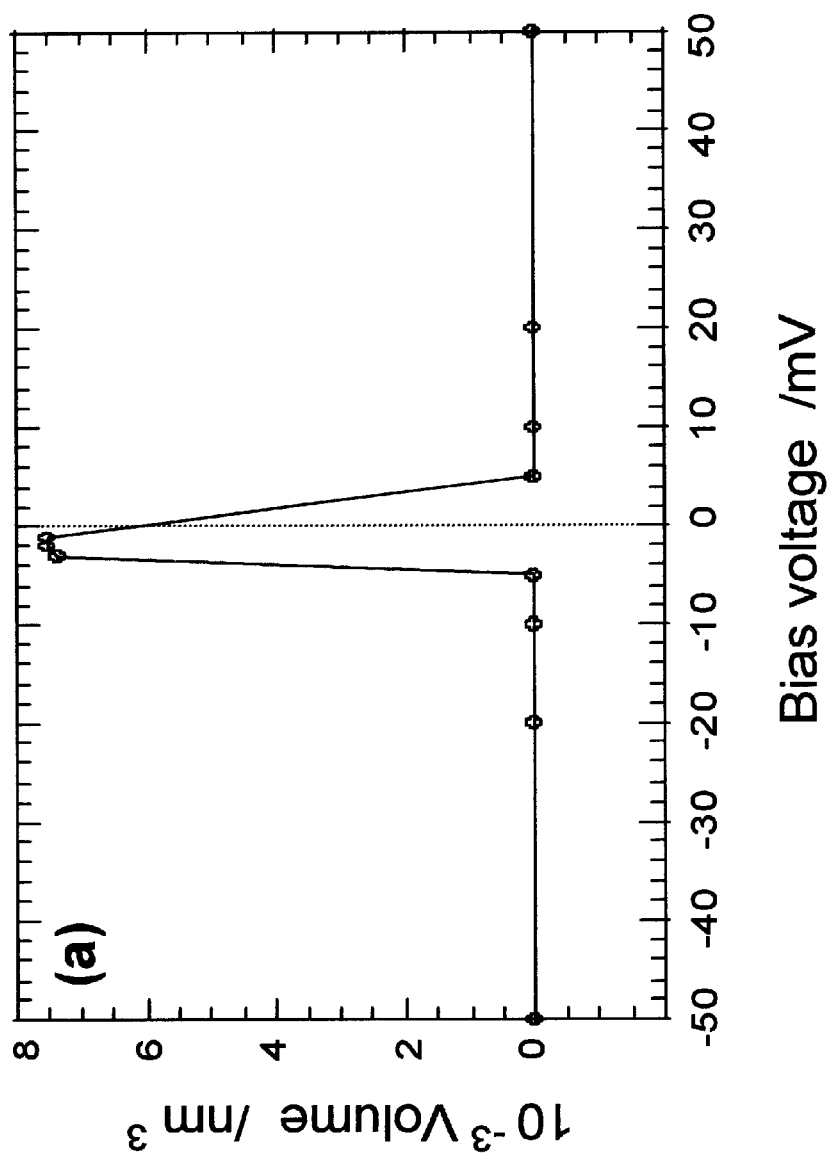
FIGS. 7a–c shows the dependence of nanopits' volume (relative value) on various operation parameters: (a) bias voltage, (b) tunnel current, (c) working potential. Each point is an average value of at least 15 individual pits fabricated under the same operational conditions.
Figure 7B:
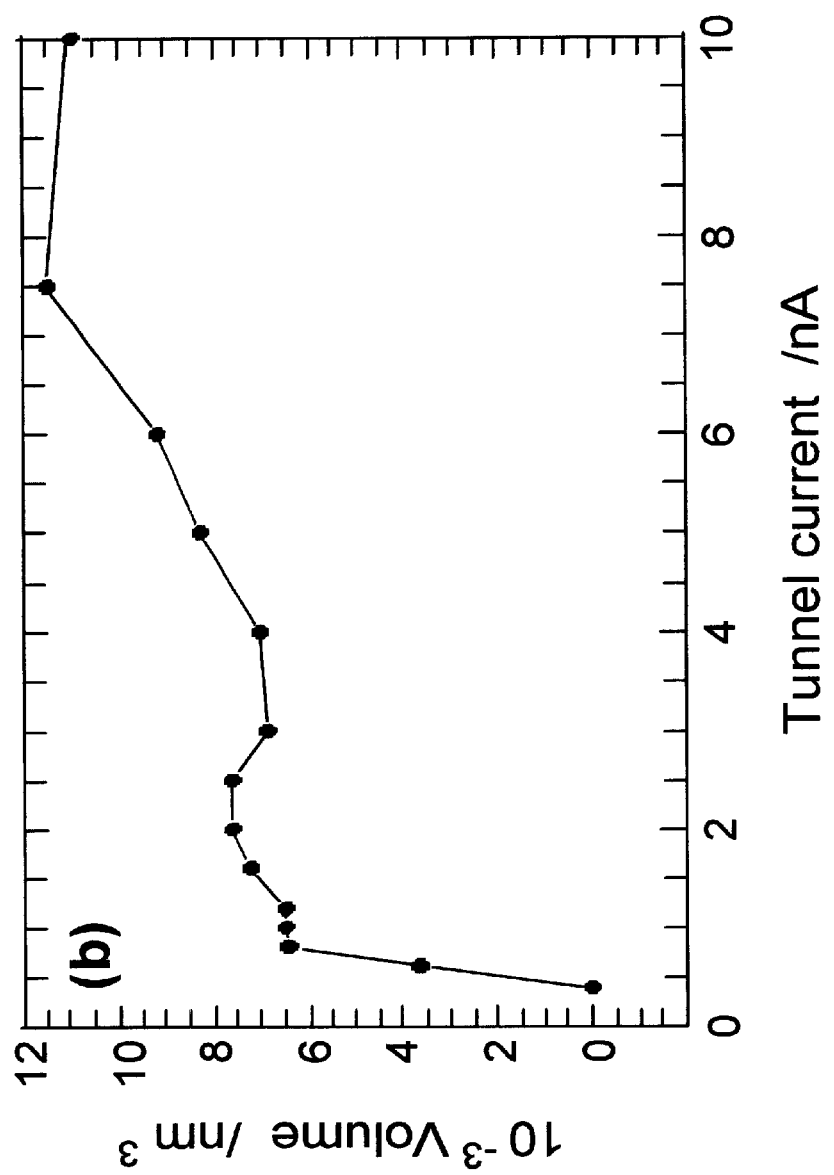
Figure 7C:
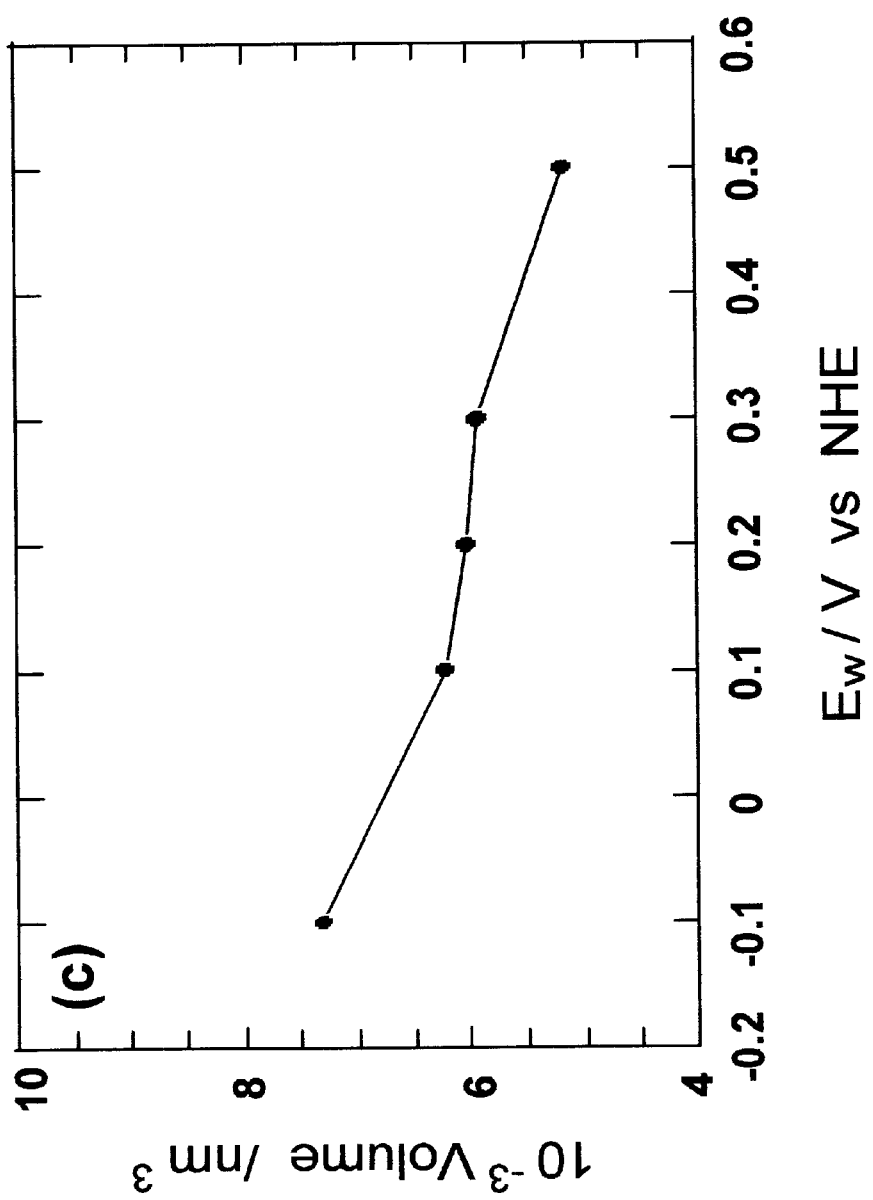

FIG. 7 is an overview of the normalised individual pit volume (each point is based on an average value of at least 15 individual pits prepared under the same conditions) when the external parameters, the bias voltage, the tunnel current, and the substrate electrode potential are varied. FIG. 7(a) illustrates again the apparent criticality and FIG. 7(b) the threshold effect, while FIG. 7(c) illustrates the weak dependence on the substrate electrode potential within the electrochemical double layer region of Au(111) in aqueous $HClO_4$.

Figure 8:
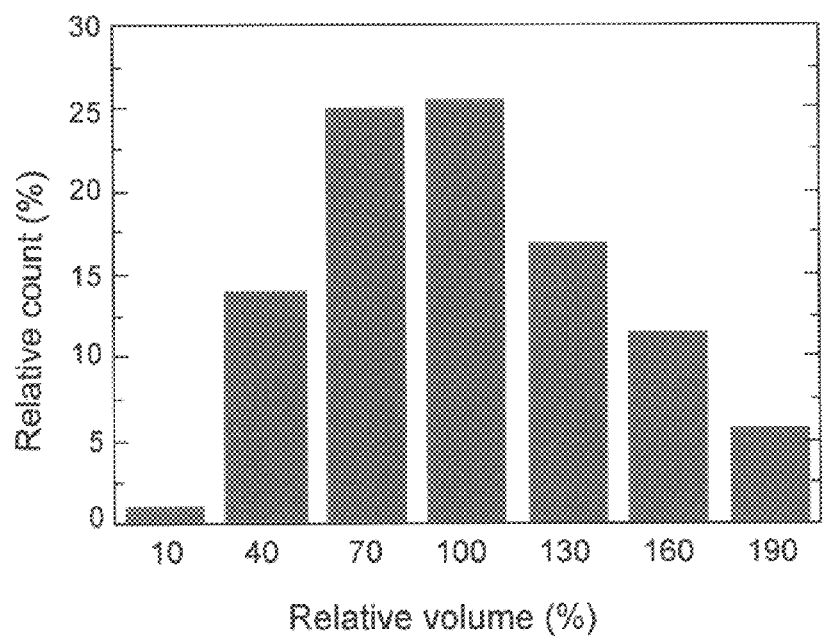
FIG. 8 shows histograms of relative volume ($V_{individual}/V_{average}$) of 87 individual nanopits successively fabricated using the same operation parameters.

The distribution of individual pit sizes can be evaluated from FIG. 8. This figure is based on a statistics of 87 individual pits that were continuously fabricated under the same operational conditions. The profile approaches a Gaussian mode.

Physical mechanisms of earlier methods for STM-induced nanostructure formation in vacuum or air include:

(a) Pulse- and voltage-induced local metal ion evaporation or melting. These effects require high fields, i.e. $10^7$ V cm$^{-2}$ or higher.

(b) Field-gradient-induced surface diffusion of metal atoms. This is caused again by high voltage pulses, which heat up the tip and transfers atoms or adatoms to the substrate surface.

(c) Electrostatic forces, which induce elastic deformation in the substrate and tip in the region of closest tip approach to the surface. At strong enough fields the tip contacts the surface, with prospects for nanoscale indentations.

(d) Electron-phonon interactions (the Nottingham effect), ultimately leading also to local melting.

(e) Field-assisted diffusion, and sliding. The former is based on strong electric field inhomogeneity in the gap region, the latter on a combination of non-covalent chemical interactions between tip and surface adatoms.

These effects all seem to contrast with the present invention, where extremely small bias voltages induce the pit formation. An approach to the resolution of this issue is not straightforward but the following notes regarding spontaneous reconstruction of noble metal surfaces in electrochemical environments and in narrow charge ranges are appropriate.

The charge flow to the substrate surface is always potentiostatically controlled by the external circuit in electrochemical STM. External charge flow is also what ultimately induces surface reconstructions and other surface phase transitions. The tip in the in situ STM mode, however, holds a finite charge, and represents a finite local field at the substrate surface when the tip is very close to the surface.

Ways of calculating such a field are available. Theoretical approaches to surface reconstructions of noble metals in electrochemical environments have also been initiated, with several notions appropriate to the present invention. These are in particular:

a) Surface charge induced phase transitions of the metal surface, b) Phase diagrams involving ordered, disordered, and roughened phases, c) Observations that phase transitions between the ordered phases proceed through disordered and roughened phases, and d) The observation that these transitions are continuous.

As a proposal, the observed apparent critical bias-voltage-dependent behaviour, and the threshold effect of the pre-set tunnel current in the nanopit formation process could reflect a continuous phase transition induced by the field of the tip. Such an effect could rest on small physical interactions, in contrast to the large voltage effects otherwise needed for the formation of metallic surface nanostructures in vacuum or air—in e.g. U.S. Pat. No. 4,896,044. Such a, currently putative, scenario holds prospects for further exploration including particularly the effects of anion adsorption, and the effects of the charge and potential of zero charge of the tip materials.

The nanopits shown in FIG. 5 were obtained for Au(111) with W wire as tip source, but the method is not limited to these materials.

Metallic nanoscale structures have been reported to possess a number of technological perspectives. Merits of the methodology for nanopit structure fabrication described above are also to hold promise as structural elements in prospective nanotechnology. The following options can here be listed:

In a first embodiment nanopit arrays and pattern formation on pre-selected sites constitute tools for information storage, writing and reading processes, and nanoscale lithography. Pits can, for example, also be combined into grooves or other structures.

In a second embodiment the pits or pit arrays can be used as nucleation sites for deposition of metals different from the substrate metal. This holds nano- and microelectronic perspectives for metal combination, material doping, comprehensive construction of nanoscale devices etc. The pits can serve as templates for deposited metal, semiconductor, semimetal, and insulator deposition in a broad variety of functional organised composite materials. If the procedure is applied to thin layers of Au or other metals deposited on other conducting or semiconducting materials, then holes through the gold layers can be fabricated. This would be important in sub-micrometer reading devices.

In a third embodiment, the nanopits are potential adsorption or enclosure sites for molecular or biomacromolecular immobilisation. This holds fundamental and technological perspectives for nanoscale molecular and biomolecular dynamics.

In a fourth embodiment, the pits can be brought to function as nanoscale chemical "reactors" where chemical processes at the molecular or mesoscopic level can be controlled.

In a fifth embodiment, metalloenzymes could be immobilised in the pits by preferential adsorption or covalent immobilisation. In view of the very gentle conditions for controlled pit formation, sequential pit formation and enzyme immobilisation could provide a basis for organised arrays of different functional enzymes. In this way versatile, multi-functional enzyme electrodes, specific to a variety of substrate molecules in the solution could be constructed.

In a sixth embodiment, pit formation and pattern organisation are affected and can possibly be controlled by specific anion adsorption, as anion adsorption is known both to affect strongly the reconstruction potential and intermediate surface phases. Specific patterns are these features can also be expected to carry over to other noble metal electrode surfaces and surface crystal planes.

What is claimed is:

1. A method for forming at least one nanoscale depression in a surface of a substrate, said method comprising the steps of:

immersing at least part of the surface of the substrate into a liquid environment, immersing at least part of an object into the liquid environment, bringing the object within proximity of the surface of the substrate by applying a first set of operation parameters, said first set of operation parameters comprising bias voltage, tunnel current and working potential, and forming at least one nanoscale depression in the surface of the substrate by applying a second set of operation parameters, said second set of operation parameters comprising bias voltage, tunnel current and working potential, wherein the bias voltage of the second set of operation parameters is negative.

2. A method according to claim 1, wherein the liquid environment is an electrically conducting environment.

3. A method according to claim 2, wherein the electrically conducting environment comprises an aqueous acidic, basic, neutral, or salt containing electrolyte solution.

4. A method according to claim 3, wherein the electrically conducting environment comprises an aqueous acidic, basic, neutral, or salt containing $HClO_4$.

5. A method according to claim 4, wherein the concentration of the $HClO_4$ solution is in the range $10^{-3}$–10 M, preferably in the range 0.02–0.4 M, more preferably in the range 0.03–0.3 M and even more preferably in the range 0.05–0.1 M.

6. A method according to claim 1, wherein the object forms part of a scanning probe microscope.

7. A method according to claim 6, wherein the object forms part of a scanning tunneling microscope.

8. A method according to claim 1, wherein the object forms part of a tunneling tip of a scanning tunneling microscope.

9. A method according to claim 1, wherein the bias voltage of the second set of operation parameters is in the range −10 mV–0 V, preferably in the range −8 mV–0 V, more preferably in the range −4 mV–0 V.

10. A method according to claim 9, wherein the bias voltage of the second set of operation parameters is approximately −2 mV.

11. A method according to claim 1, wherein the tunnel current of the second set of operation parameters is in the range 0–10 nA, preferably in the range 0–6 nA, more preferably in the range 0–4 nA, even more preferably in the range 2–3 nA.

12. A method according to claim 1, wherein the working potential of the second set of operation parameters is in the range −0.1–0.5 V vs NHE, preferably in the range 0–0.4 V vs NHE, more preferably in the range 0.1–0.3 V vs NHE.

13. A method according to claim 1, wherein the bias voltage of the first set of operation parameters is in the range 100–300 mV, and wherein the tunnel current of the first set of operation parameters is in the range 0.5–5 nA, and wherein the working potential of the first set of operation parameters is in the range 0.1–0.6 V vs NHE.

14. A method according to claim 1, wherein part of the surface of the substrate holds an electrically conducting material, so that the at least one depression is formed in said electrically conducting material.

15. A method according to claim 14, wherein the electrically conducting material is a metal.

16. A method according to claim 1, wherein part of the surface of the substrate holds a gold film, or constitutes bulk gold.

17. A method according to claim 1, wherein the liquid environment comprises chloride, sulphate, or other adsorbing inorganic anions or molecules.

18. A method according to claim 1, wherein part of the surface of the substrate holds a semiconductor material.

19. A method according to claim 18, wherein the semiconductor material is silicon.

20. A method according to claim 1, wherein the object forms part of a tip of a commercially available scanning probe microscope.

21. A method according to claim 20, wherein the object forms part of a tip of a commercially available scanning tunneling microscope.

* * * * *

UNITED STATES PATENT AND TRADEMARK OFFICE
CERTIFICATE OF CORRECTION

PATENT NO.    : 6,398,940 B1
DATED         : June 4, 2002
INVENTOR(S)   : Qijin Chi et al.

It is certified that error appears in the above-identified patent and that said Letters Patent is hereby corrected as shown below:

Column 2,
Line 31, change "J. Electrochem." to -- J. Electrochem. Soc. --.

Column 6,
Line 5, delete "several" and change "phases" to -- layers --.
Line 51, change "see" to -- seen --.

Signed and Sealed this

Eighth Day of July, 2003

JAMES E. ROGAN
*Director of the United States Patent and Trademark Office*

UNITED STATES PATENT AND TRADEMARK OFFICE
CERTIFICATE OF CORRECTION

PATENT NO.     : 6,398,940 B1
DATED          : June 4, 2002
INVENTOR(S)    : Qijin Chi et al.

It is certified that error appears in the above-identified patent and that said Letters Patent is hereby corrected as shown below:

<u>Title page,</u>
Item [75], Inventors, please correct the first inventor's name from "Quijin Chi" to
-- Qijin Chi --.

Signed and Sealed this

Second Day of March, 2004

JON W. DUDAS
*Acting Director of the United States Patent and Trademark Office*